US009818385B2

(12) United States Patent
Pierre-Louis

(10) Patent No.: US 9,818,385 B2
(45) Date of Patent: *Nov. 14, 2017

(54) KEY TRANSPOSITION

(71) Applicant: International Business Machines Corporation, Armonk, NY (US)

(72) Inventor: Marc-Arthur Pierre-Louis, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,946

(22) Filed: Apr. 7, 2016

(65) Prior Publication Data

US 2017/0294177 A1 Oct. 12, 2017

(51) Int. Cl.
*G01G 1/04* (2006.01)
*G10G 1/04* (2006.01)

(52) U.S. Cl.
CPC .................................... *G10G 1/04* (2013.01)

(58) Field of Classification Search
CPC ..................................................... G10G 1/04
USPC ........................................................ 84/619
See application file for complete search history.

(56) References Cited

U.S. PATENT DOCUMENTS 4,777,857 A 10/1988 Stewart
5,153,361 A * 10/1992 Kozuki .................. G10H 1/383 84/613
5,218,153 A * 6/1993 Minamitaka ............. G10H 1/38 706/902
5,223,659 A * 6/1993 Shiraki .................. G10H 1/342 84/669
5,290,967 A * 3/1994 Shimaya .................. G10H 1/46 84/609
5,424,486 A * 6/1995 Aoki ........................ G01H 3/08 84/613
5,510,572 A * 4/1996 Hayashi ................... G10H 1/38 84/609
5,777,253 A * 7/1998 Kurebayashi ............ G10H 1/36 84/613

(Continued)

OTHER PUBLICATIONS

Chiefnugget, "Resonators—track note by keyboard", Ableton Forum, Posted: Sun Nov. 4, 2012 8:15 am, 1 page, <https://forum.ableton.com/viewtopic.php?f=3&t=186417>.

(Continued)

*Primary Examiner* — David Warren
(74) *Attorney, Agent, or Firm* — Brian M. Restauro

(57) ABSTRACT

Embodiments of the present invention provide methods, computer program products, and systems to for automatic key transposition. Embodiments of the present invention can be used to determine compatibility between a known melody capable of being generated by a pitch generation system and a first performance profile associated with a first performer that performs in conjunction with the pitch generation system. Embodiments of the present invention can be further used to determine an appropriate key to update one or more pitches associated with the known melody, to be generated by the pitch generation system during the performance by the first performer, based on the compatibility between the first performance profile and the known melody.

14 Claims, 5 Drawing Sheets

(56) References Cited

U.S. PATENT DOCUMENTS

| | | | | |
|---|---|---|---|---|
| 6,124,543 | A * | 9/2000 | Aoki | G10H 1/0025 84/609 |
| 6,160,213 | A | 12/2000 | Arnold et al. | |
| 6,995,311 | B2 * | 2/2006 | Stevenson | G10H 1/02 84/654 |
| 7,081,580 | B2 | 7/2006 | Brinkman et al. | |
| 7,301,093 | B2 | 11/2007 | Sater et al. | |
| 7,314,993 | B2 * | 1/2008 | Nishitani | G10H 1/0008 84/612 |
| 7,514,620 | B2 * | 4/2009 | Friedman | G10H 1/44 84/454 |
| 8,253,006 | B2 * | 8/2012 | Kim | G10H 1/20 84/609 |
| 8,686,274 | B2 * | 4/2014 | Fukuda | G10H 1/20 84/609 |
| 8,912,420 | B2 * | 12/2014 | Seyfer | G10H 1/0008 84/634 |
| 2001/0045154 | A1 * | 11/2001 | Aoki | G10H 1/36 84/609 |
| 2001/0047384 | A1 | 11/2001 | Croy | |
| 2003/0100965 | A1 * | 5/2003 | Sitrick | G09B 15/023 700/83 |
| 2005/0016362 | A1 * | 1/2005 | Nishitani | G10H 1/0008 84/612 |
| 2007/0022866 | A1 * | 2/2007 | Perla | G09B 15/00 84/609 |
| 2008/0190270 | A1 * | 8/2008 | Kang | G10H 1/0025 84/613 |
| 2010/0192755 | A1 * | 8/2010 | Morris | G10H 1/0025 84/637 |
| 2011/0251840 | A1 * | 10/2011 | Cook | G10H 1/366 704/207 |
| 2012/0073423 | A1 * | 3/2012 | Okuda | G10H 1/36 84/613 |
| 2013/0070093 | A1 * | 3/2013 | Rivera | G11B 27/002 348/143 |
| 2013/0118336 | A1 * | 5/2013 | Wakai | G10H 1/40 84/609 |
| 2014/0109751 | A1 * | 4/2014 | Hilderman | G10H 1/38 84/613 |
| 2014/0140536 | A1 * | 5/2014 | Serletic, II | G06F 3/0481 381/98 |
| 2014/0208921 | A1 * | 7/2014 | Seyfer | G10H 1/0008 84/609 |
| 2015/0189397 | A1 | 7/2015 | Rivera et al. | |
| 2015/0228270 | A1 * | 8/2015 | Okuda | G10H 1/0008 84/609 |
| 2015/0317965 | A1 * | 11/2015 | Horvath | G10H 1/0041 84/609 |
| 2016/0057316 | A1 * | 2/2016 | Godfrey | H04N 5/04 348/515 |
| 2016/0098978 | A1 * | 4/2016 | Horvath | G10H 1/0041 84/609 |
| 2016/0358595 | A1 * | 12/2016 | Sung | G10H 1/368 |

OTHER PUBLICATIONS

Feitsch et al., “Tangible and Body-Related Interaction Techniques for a Singing Voice Synthesis Installation”, 8th International Conference on Tangible, Embedded and Embodied Interaction (TEI’14), Feb. 16-19, 2014, Munich, Germany,Copyright © 2014 ACM, pp. 157-164.

“Correcting Midi keyboard input using Scale”, Albeton, Talisman 1 year ago, Found on Post Disclosure Information for END-8-2015-0585 created by Mark Peters on Oct. 27, 2015 12:41:00 PM EDT, [Accessed Online—Feb. 19, 2016 9:01 AM], 3 pages, <https://www.ableton.com/answers/correcting-midi-keyboard-input-using-scale>.

* cited by examiner

KEY TRANSPOSITION

BACKGROUND

The present invention relates generally to the field of pitch adjustment and more particularly to automatic key transposition.

Generally, pitch adjustment refers to a sound recording technique in which the original pitch of a sound is raised or lowered. Typically, effects programs raise or lower pitch by a pre-designated musical interval (i.e., a transposition). Typically, musicians who accompany a vocalist (e.g., a pianist) may transpose a piece of music in a higher or lower key to complement the vocalist's voice. In some cases, a singer may elect to sing in a higher or lower key to accommodate the playing ability of an accompanist.

SUMMARY

Embodiments of the present invention provide methods, computer program products, and systems to for automatic key transposition. In one embodiment of the present invention, a computer-implemented method is provided comprising: determining compatibility between a known melody capable of being generated by a pitch generation system and a first performance profile associated with a first performer that performs in conjunction with the pitch generation system; and determining an appropriate key to update one or more pitches associated with the known melody, to be generated by the pitch generation system during the performance by the first performer, based on the compatibility between the first performance profile and the known melody.

DETAILED DESCRIPTION

Embodiments of the present invention recognize the need for key transposition. Currently, a musician has to either manually transpose music or press a series of buttons (e.g., on an electric keyboard) to find a key that is compatible with a vocalist's range. Embodiments of the present invention provide solutions for automatic key transposition based, at least in part, on the melody of the song and compatibility with a vocalist's pitch. In this manner, as described in greater detail later in this specification, embodiments of the present invention can identify the melody of a song, and based on the song's profile and the vocalist's range automatically transpose music into the complimentary key for the vocalist.

Figure 1:
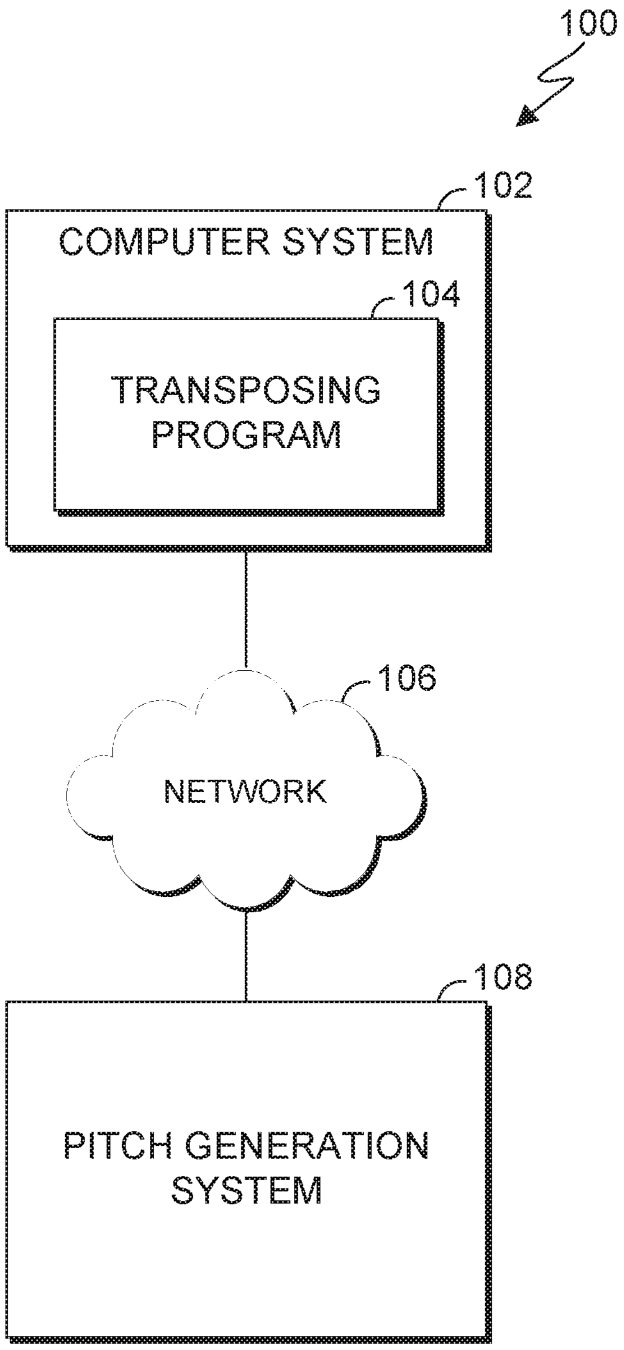
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102 and pitch generation system 108. Computer system 102 and pitch generation system 108 can be desktop computers, laptop computers, specialized computer servers, or any other computer systems known in the art. In certain embodiments, computer system 102 and pitch generation system 108 represent computer systems utilizing clustered computers and components to act as a single pool of seamless resources when accessed through network 106. For example, such embodiments may be used in data center, cloud computing, storage area network (SAN), and network attached storage (NAS) applications. In certain embodiments, computer system 102 and pitch generation system 108 represent virtual machines. In general, computer system 102 and pitch generation system 108 are representative of any electronic devices, or combination of electronic devices, capable of executing machine-readable program instructions, as described in greater detail with regard to FIG. 5.

Computer system 102 includes transposing program 104. Transposing program 104 communicates with pitch generation system 108 via network 106 (e.g., using TCP/IP) to perform key changes based at least in part on an identified melody and compatibility to a vocalist, as discussed in greater detail with regards to FIGS. 2-4. For example, transposing program 104 can receive a request to perform a key change and identify a melody from an audio source. Transposing program 104 can then identify a song associated with the melody and retrieve a default key associated with the song. Transposing program 104 can then determine compatibility between a vocalist's pitch and the default key associated with the identified song. Responsive to determining that the vocalist's pitch and the default key are incompatible, transposing program 104 can transpose to the appropriate key compatible with the vocalist's pitch.

Network 106 can be, for example, a local area network (LAN), a wide area network (WAN) such as the Internet, or a combination of the two, and include wired, wireless, or fiber optic connections. In general, network 106 can be any combination of connections and protocols that will support communications between computer system 102 and pitch generation system 108, in accordance with a desired embodiment of the invention.

Pitch generation system 108 generates one or more tones in a sequence that forms a melody. Pitch generation system 108 can be implemented with any suitable program that is compatible with transposing program 104 that can generate a melody. For example, pitch generation system 108 can be implemented with any audio source capable of generating sound. In some embodiments, pitch generation system 108 can be an electrical keyboard. In other embodiments, pitch generation system 108 can have a database of audio files that can be selected. In yet other embodiments, pitch generation system 108 can be coupled to a microphone and receive input from a vocalist (e.g., an audio sample of a vocalist's voice).

It should be understood that, for illustrative purposes, FIG. 1 shows transposing program 104 and pitch generation system 108 as residing on different systems. However, it should be understood that transposing program 104 and pitch generation system 108 can reside on the same system. Furthermore, it should be understood that for illustrative purposes, FIG. 1 does not show other computer systems and elements which may be present when implementing embodiments of the present invention. For example, while FIG. 1 shows a single computer system 102 and a single pitch generation system 108, computing environment 100 can also include additional computer systems 102 and pitch generation systems 108 that use transposing program 104 to automatically transpose keys based on an identified melody and compatibility to a vocalist's profile.

Figure 2:
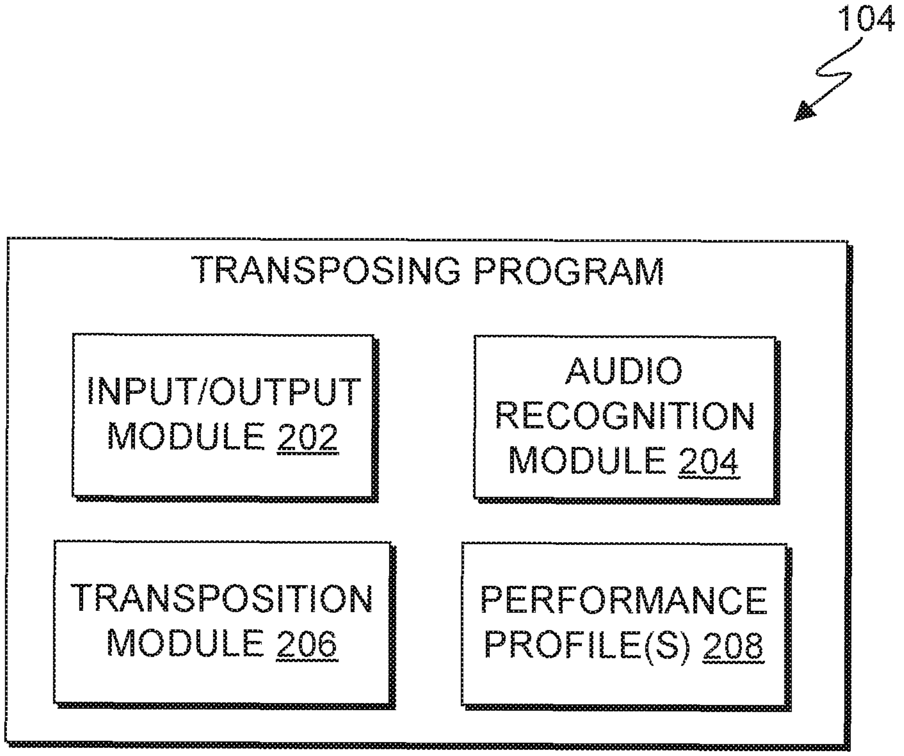
FIG. 2 is a block diagram showing a machine logic (for example, software) portion, in accordance with an embodiment of the present invention.

FIG. 2 is a block diagram showing a machine logic (for example, software) portion, in accordance with an embodiment of the present invention.

Transposing program 104 includes input/output module 202, audio recognition module 204, transposition module 206, and performance profile(s) 208. Input/output module 202 receives inputs from one or more components of computing environment 100 and transmits outputs from transposition module 206. In this embodiment, an input may be a request to perform a key change. An input may also be a collection of notes and/or tones that form a melody from which a song and its associated default key can be identified.

Audio recognition module 204 receives input (e.g., a collection of notes and/or tones) and identifies melodies and associated songs with the identified melodies based, at least in part on the received collection of notes and/or tones. In some instances, the collection of notes and/or tones may be a few notes played audibly. In other instances, the collections of notes from which a melody can be identified may be from a sampling of a vocalist's voice. Audio recognition module 204 can further retrieve default keys associated with the identified songs.

Transposition module 206 transposes to keys compatible with a user's voice. Where the appropriate key is known (i.e., a regular transpose event), transposition module 206 can, responsive to receiving the appropriate key (e.g., from a user input), invoke standard key change logic to change to the appropriate key. For example, responsive to receiving a request to change keys where the appropriate key is known, transposition module 206 can display a list of keys that can be selected (e.g., by a user), as discussed in greater detail below. In other embodiments, transposition module 206 may automatically transpose to a key within a user's performance profile.

In instances where the appropriate key is not known (i.e., an irregular transpose event), transposition module 206 can receive output from audio recognition module 204 (e.g., identified melodies and associated songs) and determine compatibility between a vocalist's pitch and the default key associated with the identified song. In this embodiment, transposition module 206 can determine compatibility between a vocalist's pitch and the default key associated with the identified song as by standard methods (or unknown methods) known in the art. For example, transposition module 206 can receive an audio sample of the vocalist's voice and determine the compatibility of the vocalist's pitch and the default key associated with the identified song. Responsive to determining that the vocalist's pitch and the default key are incompatible, transposing program 104 can transpose to the appropriate key compatible with the vocalist's pitch.

Performance profile(s) 208 refers to a collection of performers' profiles. A "performance profile" as used herein, refers to a range of pitches that a performer is capable of producing. In this embodiment, a performer is a vocalist. In instances where the performer is a vocalist, the performer's profile associated with the vocalist includes a list of songs and the key in which the song needs to be performed in for the vocalist. In this embodiment, performance profiles are based on prior inputs received from performers which can be used to determine the range of pitches attainable to the specific performer. For example, in instances where the performance profile is created for a vocalist, the performance profile can indicate that the vocalist is comfortable with the Key of C, that the vocalist can hit the higher notes of a key above C but struggles with the lower notes of that key. In other embodiments, the performance profile can be created for other instrumentalists (e.g., trumpeters) as other instrumentalists can experience similar range/key limitations as a vocalist.

Performance profile(s) 208 can be accessed by transposition module 206 to determine compatibility with an identified song. For example, where a song is played in the Key of D, transposition module 206 can retrieve the vocalist's performance profile and identify that the vocalist is capable of singing all portions of the song in the Key of B flat (a major third down). Responsive to determining that the vocalist's performance profile is incompatible with the default key of the song, transposition module 206 can transpose the key of the song to B flat. Accordingly, a user (e.g., a musician accompanying the vocalist) can play in the appropriate key to complement the vocalist's range.

In other embodiments, transposition module 206 can access performance profile(s) 208 and display a list of keys that is within the performer's (e.g., the vocalist) range of pitches. In some instances, this manual selection of keys that is within the performer's range of pitches may be desirable to enable the user to select a preferable key based on context information corresponding to the composition that may not be available to the software. For example, a performer may realize that, with respect to a particular song, the key of A sits in a slightly less comfortable register than the key of G, but a certain sequence of notes in the song is much easier to perform in A than G. The performer may therefore prefer the key of A in this instance. Accordingly, the user may select the key of A to accompany the performer.

Figure 3:
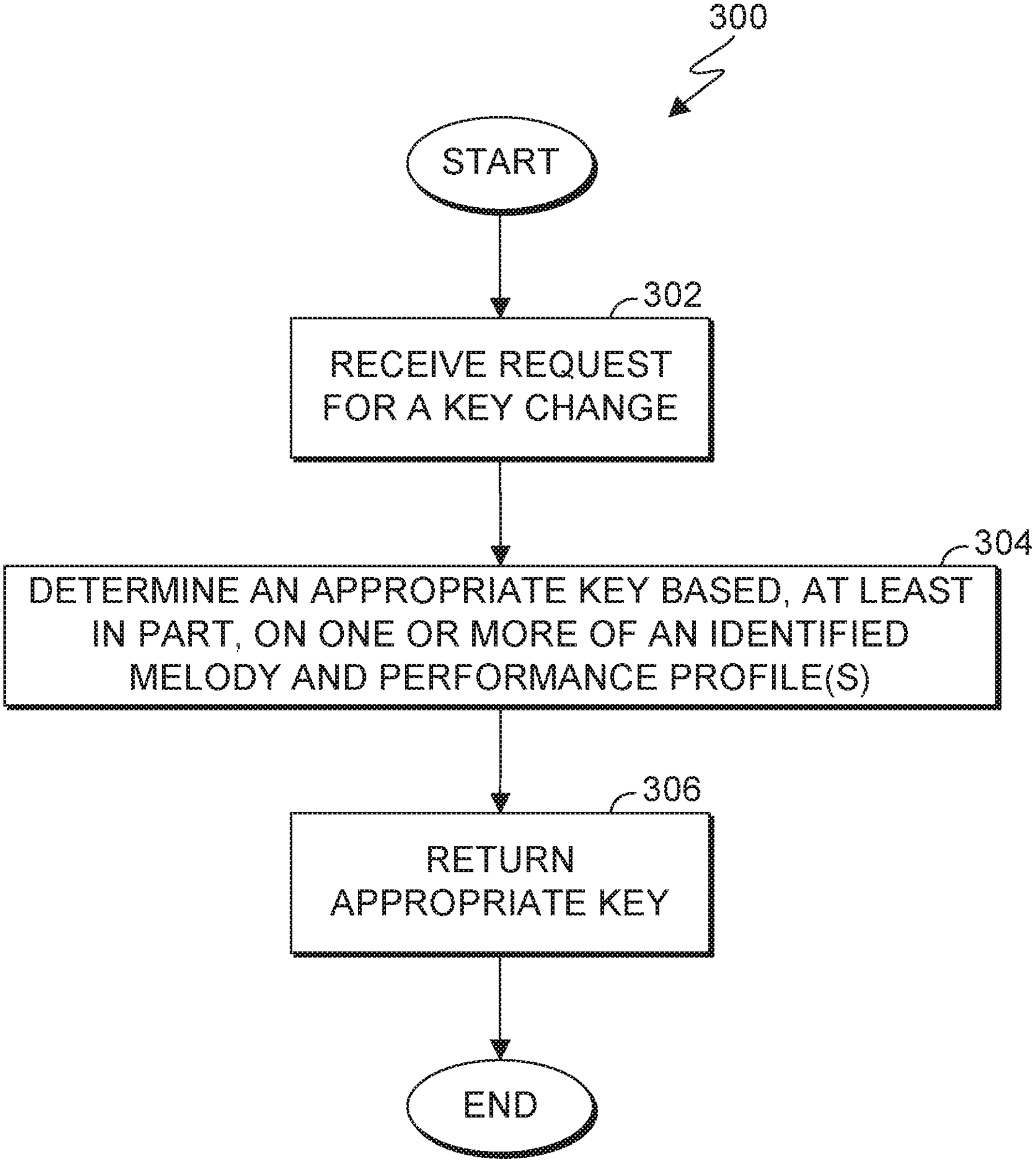
FIG. 3 is a flowchart illustrating operational steps for performing a key change, in accordance with an embodiment of the present invention.

FIG. 3 is a flowchart illustrating operational steps for performing a key change, in accordance with an embodiment of the present invention.

In step 302, transposition module 206 receives a request for a key change. In this embodiment, transposition module 206 receives a request for a key change from a user of computer system 102. In other embodiments, transposition module 206 can receive a request for a key change from one or more other components of computing environment 100.

In step 304, transposition module 206 determines an appropriate key based, at least in part, on one or more of an identified melody and performance profiles. In this embodiment, transposition module 206 determines an appropriate key to change to by accessing performance profile(s) 208, identifying a vocalist's range based on the vocalist's performance profile, and comparing the vocalist's performance profile to the default key of the identified melody, as discussed in greater detail with regard to FIG. 4.

In step 306, input/output module 202 returns the appropriate key to pitch generation system 108. In this embodiment, input/output module 202 returns the appropriate key to pitch generation system 108 via network 106. For example, where transposition module 206 determines that the performer's performance profile is incompatible with the identified song and default key associated with the identified song, transposition module 206 can transpose to the appropriate key. Input/output module 202 can then transmit the appropriate key to pitch generation system 108.

Accordingly, the user can play in the appropriate key to accompany the vocalist regardless of the key the user is actually playing. For example, the user can have sheet music for a song that is played in the Key of D. Where transposition module 206 has determined the appropriate key to accompany the vocalist is B flat, pitch generation system 108 can generate pitches in the Key of B flat despite the user playing in the Key of D thereby enabling the user of pitch generation system 108 to complement the vocalist without having to manually transpose the sheet music.

In other embodiments, input/output module 202 can transmit a notification to other pitch generation systems connected to network 106 that pitch generation system 108 is changing to a different key. Accordingly, responsive to receiving a notification that pitch generation system 108 is changing keys, other pitch generation systems connected to network 106 can adjust to the appropriate key to match pitch generation system 108.

Figure 4:
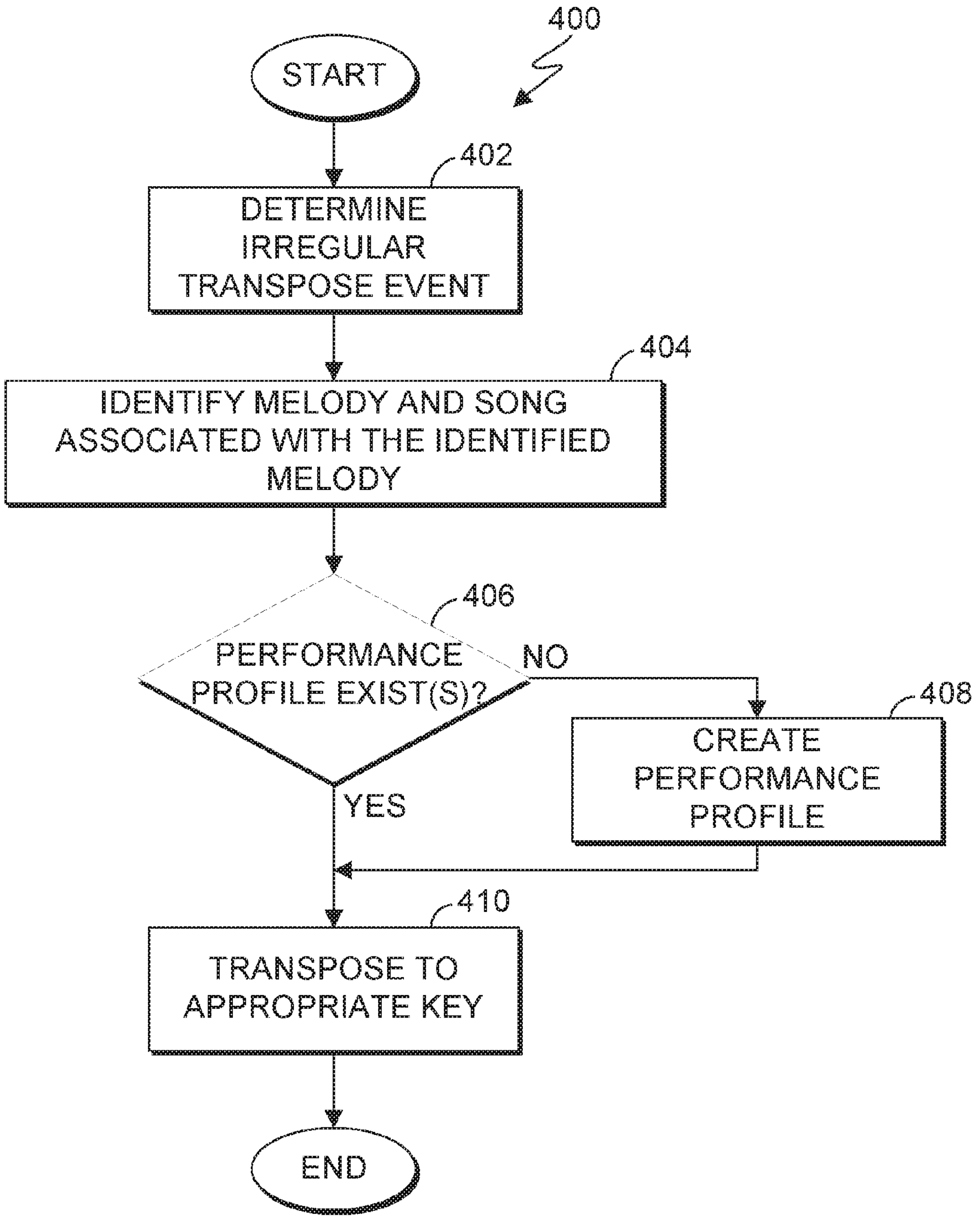
FIG. 4 is a flowchart illustrating operational steps for transposing based, at least in part on an identified melody and user profile, in accordance with an embodiment of the present invention.

FIG. 4 is a flowchart illustrating operational steps for transposing based, at least in part on an identified melody and user profile, in accordance with an embodiment of the present invention. For example, the operational steps of flowchart 400 can be performed at step 304 of flowchart 300.

In step 402, transposition module 206 determines an irregular transpose event. A transpose event as used herein, refers to a request to possibly transpose from one key to a higher or lower key. A "regular" transpose event as used herein, refers to a request to transpose from one known key, to another known key. For example, a regular transpose even can occur in instances where a song's default key is known (e.g., Key of D) and the desired key (e.g., Key of B flat) is known.

An "irregular" transpose event as used herein, refers to a request to transpose from a known or unknown key to another, unknown key. For example, an irregular transpose event can occur in instances where the user may know a few notes associated with a melody of a song but may not know a vocalist's range and whether or not the vocalist's range is compatible with the default key of the song. In this embodiment, transposition module 206 determines that there is an irregular transpose event from user input. For example, the user can specify that he or she does not know the default key of the song. In another example, the user can specify that he or she only knows the melody of the song. In another example, the user may specify that he or she does not know the vocalist's range. Accordingly, the user can prompt the vocalist to sing a few notes of the melody of the song.

In step 404, audio recognition module 204 identifies a melody and song associated with the identified melody. In this embodiment, audio recognition module 204 identifies a melody and a song associated with the identified melody from a brief sample of audio (e.g., a vocalist singing or from a collection of notes played from an audio source) and compares the brief sample of audio to a central database to find a match. Accordingly, audio recognition module 204 can transmit its results (e.g., the identified melody and song) to transposition module 206.

In step 406, transposition module 206 determines whether a performance profile exists. In this embodiment, transposition module 206 determines that a performance profile exists based, at least in part, on the user's input. For example, a user input may be to specify a vocalist's name. In some instances, the user may input a sampling of the vocalist's voice. Responsive to receiving the user's input (e.g., a vocalist's name or audio sampling of the vocalist's voice), transposition module 206 can compare the user's input to performance profile(s) 208 and match the user input to a respective performance profile in performance profile(s) 208.

If, in step 406, transposition module 206 determines that a performance profile does not exist, then in step 408, transposition module 206 creates a performance profile for the vocalist. In this embodiment, transposition module 206 creates a performance profile for the vocalist by recording a sampling of the vocalist's voice and determining the vocalist's range. Accordingly, logic flow continues at step 410.

If, in step 406, transposition module 206 determines that a performance profile does exist, then, in step 410, transposition module 206 transposes to the appropriate key that is compatible with the vocalist. In this embodiment, transposition module 206 transposes to the appropriate key by determining whether the performance profile is compatible with the default key of the identified song by comparing the key retrieved from the performance profile with the default key of the identified song.

For example, where a song is played in the Key of D, transposition module 206 can retrieve the vocalist's performance profile and identify that the vocalist is capable of singing the song in the Key of B flat (a major third down). Responsive to determining that the vocalist's performance profile is incompatible with the default key of the song, transposition module 206 can transpose the key of the song to B flat. Input/output module 202 can then transmit the appropriate key to pitch generation system 108, as previously discussed with regard to step 306 of flowchart 300. Accordingly, a user of transposing program 104 (e.g., an electric keyboardist) can play in the appropriate key without having to manually transpose keys to accompany the vocalist.

Figure 5:
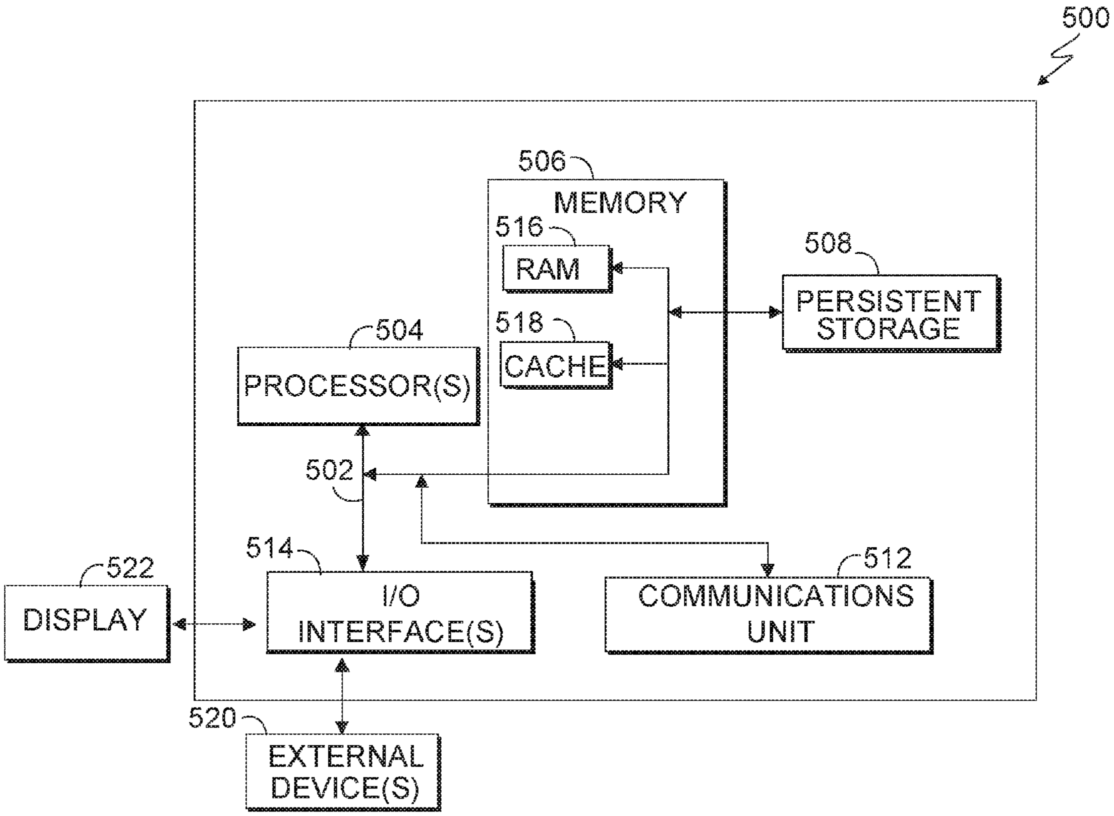
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 106). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

determining compatibility between a known melody capable of being generated by a pitch generation system and a first performance profile associated with a first performer that performs in conjunction with the pitch generation system;

determining an appropriate key to update one or more pitches associated with the known melody, to be generated by the pitch generation system during the performance by the first performer, based on the compatibility between the first performance profile and the known melody;

updating the pitch generation system to generate pitches associated with the appropriate key;

transmitting a notification to other pitch generation systems connected to the pitch generation system via a network that a key change event is taking place; and updating the pitch generation systems connected via the network to generate pitches matching the appropriate key.

2. The computer-implemented method of claim 1, further comprising:

providing an option to a user of the pitch generation system to update from default pitches associated with the known melody to a first set of pitches associated with a first key, a second set of pitches associated with the appropriate key, or a third set of pitches associated with a third key.

3. The computer-implemented method of claim 1, further comprising:

creating a second performance profile associated with a second performer; and determining compatibility between the known melody capable of being generated by the pitch generation system and the second performance profile associated with the second performer that performs in conjunction with the pitch generation system.

4. The computer-implemented method of claim 3, further comprising:

responsive to determining there is not compatibility between the created second performance profile and the known melody, determining the appropriate key to update pitches associated with the known melody, to be generated by the pitch generation system during the performance by the second performer.

5. The computer-implemented method of claim 1, wherein a melody is identified as the known melody using one or more audio inputs.

6. A computer program product comprising:

one or more computer readable storage media and program instructions stored on the one or more computer readable storage media, the program instructions comprising:

program instructions to determine compatibility between a known melody capable of being generated by a pitch generation system and a first performance profile associated with a first performer that performs in conjunction with the pitch generation system;

program instructions to determine an appropriate key to update one or more pitches associated with the known melody, to be generated by the pitch generation system during the performance by the first performer, based on the compatibility between the first performance profile and the known melody;

program instructions to update the pitch generation system to generate pitches associated with the appropriate key;

program instructions to transmit a notification to other pitch generation systems connected to the pitch generation system via a network that a key change event is taking place; and program instructions to update the pitch generation systems connected via the network to generate pitches matching the appropriate key.

7. The computer program product of claim 6, wherein the program instructions stored on the one or more computer readable storage media further comprise:

program instruction to provide an option to a user of the pitch generation system to update from default pitches associated with the known melody to a first set of pitches associated with a first key, a second set of pitches associated with the appropriate key, or a third set of pitches associated with a third key.

8. The computer program product of claim 6, wherein the program instructions stored on the one or more computer readable storage media further comprise:

program instructions to create a second performance profile associated with a second performer; and program instructions to determine compatibility between the known melody capable of being generated by the pitch generation system and the second performance profile associated with the second performer that performs in conjunction with the pitch generation system.

9. The computer program product of claim 8, wherein the program instructions stored on the one or more computer readable storage media further comprise:

program instructions to, responsive to determining there is not compatibility between the created second performance profile and the known melody, determine the appropriate key to update pitches associated with the known melody, to be generated by the pitch generation system during the performance by the second performer.

10. The computer program product of claim 6, wherein a melody is identified as the known melody using one or more audio inputs.

11. A computer system comprising:

one or more computer processors;

one or more computer readable storage media; and program instructions stored on the one or more computer readable storage media for execution by at least one of the one or more computer processors, the program instructions comprising:

program instructions to determine compatibility between a known melody capable of being generated by a pitch generation system and a first performance profile associated with a first performer that performs in conjunction with the pitch generation system;

program instructions to determine an appropriate key to update one or more pitches associated with the known melody, to be generated by the pitch generation system during the performance by the first performer, based on the compatibility between the first performance profile and the known melody;

program instructions to update the pitch generation system to generate pitches associated with the appropriate key;

program instructions to transmit a notification to other pitch generation systems connected to the pitch generation system via a network that a key change event is taking place; and program instructions to update the pitch generation systems connected via the network to generate pitches matching the appropriate key.

12. The computer system of claim 11, wherein the program instructions stored on the one or more computer readable storage media further comprise:

program instruction to provide an option to a user of the pitch generation system to update from default pitches associated with the known melody to a first set of pitches associated with a first key, a second set of pitches associated with the appropriate key, or a third set of pitches associated with a third key.

13. The computer system of claim 11, wherein the program instructions stored on the one or more computer readable storage media further comprise:

program instructions to create a second performance profile associated with a second performer; and program instructions to determine compatibility between the known melody capable of being generated by the pitch generation system and the second performance profile associated with the second performer that performs in conjunction with the pitch generation system.

14. The computer system of claim 13, wherein the program instructions stored on the one or more computer readable storage media further comprise:

program instructions to, responsive to determining there is not compatibility between the created second performance profile and the known melody, determine the appropriate key to update pitches associated with the known melody, to be generated by the pitch generation system during the performance by the second performer.

* * * * *